United States Patent [19]

Nakamura et al.

[11] Patent Number: 4,653,601
[45] Date of Patent: Mar. 31, 1987

[54] ELECTRIC POWER STEERING SYSTEM FOR A MOTOR VEHICLE

[75] Inventors: Keiichi Nakamura, Kariya; Kunihiko Eto, Toyota; Mikio Suzuki, Hekinan; Masaaki Hayashi; Shigeo Iwashita, both of Okazaki, all of Japan

[73] Assignee: Toyoda Koki Kabushiki Kaisha, Kariya, Japan

[21] Appl. No.: 813,834

[22] Filed: Dec. 27, 1985

[30] Foreign Application Priority Data

Dec. 27, 1984 [JP] Japan ................... 59-279786

[51] Int. Cl.⁴ .................................. B62D 5/04
[52] U.S. Cl. ....................... 180/79.1; 180/142
[58] Field of Search .............. 180/79.1, 142, 133, 180/53.5; 74/388 PS

[56] References Cited

U.S. PATENT DOCUMENTS

| 2,454,070 | 11/1948 | Le Tourneau | 180/53.5 |
| 2,860,717 | 11/1958 | Jedrzykowski et al. | 180/53.5 |
| 4,437,532 | 3/1984 | Nakamura et al. | 180/142 |
| 4,471,280 | 9/1984 | Stack | 318/586 |
| 4,538,698 | 9/1985 | Hashimoto et al. | 180/142 |
| 4,582,155 | 4/1986 | Ohe | 180/79.1 |

OTHER PUBLICATIONS

Automotive Technology Series, vol. 10, supervised by Takeshi Saito, published: Oct. 5, 1980, p. 42.

Primary Examiner—John J. Love
Assistant Examiner—Donn McGiehan
Attorney, Agent, or Firm—Oblon, Fisher, Spivak, McClelland & Maier

[57] ABSTRACT

In an electric power steering system, a d.c. motor is drivingly connected to a steering shaft with a steering for generating an assisting power to rotate the steering shaft. Independently of an alternator for charging a battery, a d.c. generator driven by a vehicle engine is dedicated for supplying an electric power to the d.c. motor. A control circuit is responsive to a signal representing a manual torque applied to the steering and reads out one of objective values from a memory. The control circuit is further responsive to a fed-back signal indicative of a load applied to the d.c. motor and controls electric current flowing across a field coil of the d.c. generator in such a manner that the difference between the read-out objective value and the fed-back signal becomes zero.

3 Claims, 7 Drawing Figures

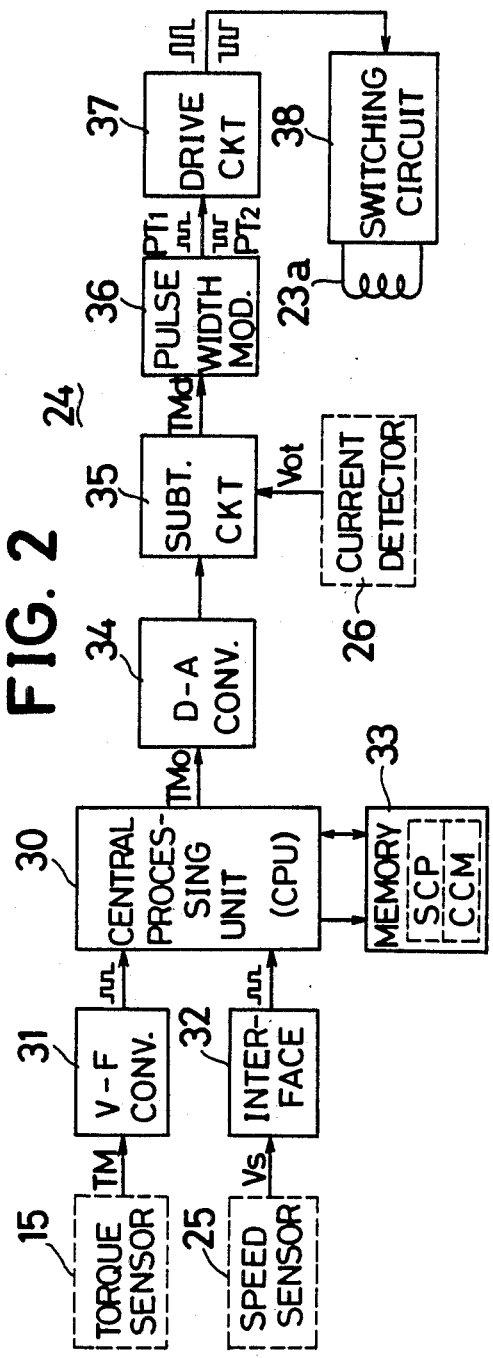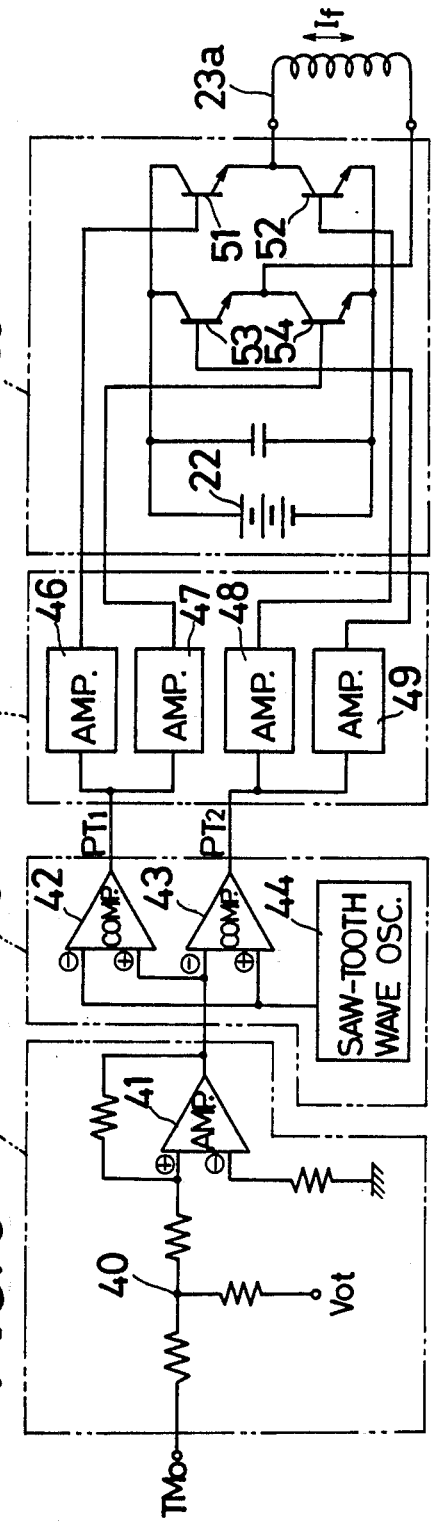

ELECTRIC POWER STEERING SYSTEM FOR A MOTOR VEHICLE

BACKGROUND OF THE INVENTION

1. Field of the Invention

The present invention relates to an electric power steering system of the type wherein an electric motor generates an assisting power to rotate a steering shaft of a motor vehicle.

2. Discussion of the Prior Art

There have been proposed many types of electric power steering systems which utilize an electric motor as a means for generating an assisting power to rotate a steering shaft. In the proposed systems, a battery is used as a power supply not only to a conventional electric system for the vehicle, but also to the power assisting electric motor. An alternator for charging the battery is driven by the vehicle engine, and thus, the electric power generated by the alternator largely varies depending upon the rotational speed of the engine. To avoid this, the voltage generated by the alternator is controlled by a voltage regulator in such a manner as to maintain the battery voltage constant, e.g., 12 volts.

However, electric motors presently available are incapable of generating a torque required for power assist of the steering system when they are driven under such a low voltage. This makes the practical use of any of the proposed electric power steering systems difficult. Although for a solution to this problem, it may be conceived to permit a sufficient electric current to flow across a rotor winding of the motor by thickening the rotor winding, such would necessarily result in enlarging the electric motor to the extent that the same cannot be practically used.

Further, in order to obtain a required torque for the power assist, a large electric current must be applied to the power assisting motor. This causes the control of the electric current applied to the motor to be difficult and also leads to a large controller as a result of using large capacity control elements. In addition, the control of such a large electric current by the large capacity control elements involves a great energy loss due to a large quantity of heat generated, thereby bringing about useless consumption of the vehicle engine power.

SUMMARY OF THE INVENTION

Accordingly, it is a primary object of the present invention to provide an improved electric power steering system which enables an electric motor presently available to reliably generate a required assisting power notwithstanding that the power level of a power supply to a conventional electric system for the vehicle remains unchanged.

Another object of the present invention is to provide an improved electric power steering system of the character set forth above which is capable of easily generating a large electric power applied to a power assisting electric motor by utilizing the rotational power of a vehicle engine.

A further object of the present invention is to provide an improved electric power steering system of the character set forth above which is capable of easily and efficiently controlling a large electric power applied to a power assisting electric motor.

An additional object of the present invention is to provide an improved electric power steering system of the character set forth above which is relatively easily retrofittable to motor vehicles which are not particularly designed therefor.

Briefly, an electric power steering system according to the present invention includes an electric motor for generating an assisting power to rotate a steering shaft. Independently of a first generator which charges a battery, a second generator driven by an engine of the vehicle is further provided for generating an electric power to the electric motor. A control circuit is connected to receive from a torque sensor a signal which represents a manual torque applied to a steering attached to the steering shaft. The control circuit controls the second generator to output to the electric motor an electric power which is determined based upon the signal from the torque sensor.

With this configuration, since a high power generator can be used as a power supply to the electric motor, the same can be supplied with an electric power which meets an assisting power required to generate.

In another aspect of the present invention, the control circuit controls the electric power generated by the second generator by regulating an electric current applied to a field coil of the second generator. Since the electric power supplied to the field coil is small, it can be controlled easily and reliably, whereby the power steering system can be given any desired steering characteristic.

BRIEF DESCRIPTION OF THE ACCOMPANYING DRAWINGS

The foregoing and other objects, features and many of the attendant advantages of the present invention will be readily appreciated as the same becomes better understood when the following embodiment is considered by reference to the accompanying drawings, wherein same reference numerals designate identical or corresponding parts throughout the several views, and in which:

FIG. 2 is a detailed block diagram of an exciting current controller shown in FIG. 1;

FIG. 3 is a circuit diagram illustrating the detailed configuration of a subtraction circuit, a pulse width modulator, a drive circuit and a switching circuit shown in FIG. 2;

Figure 7:
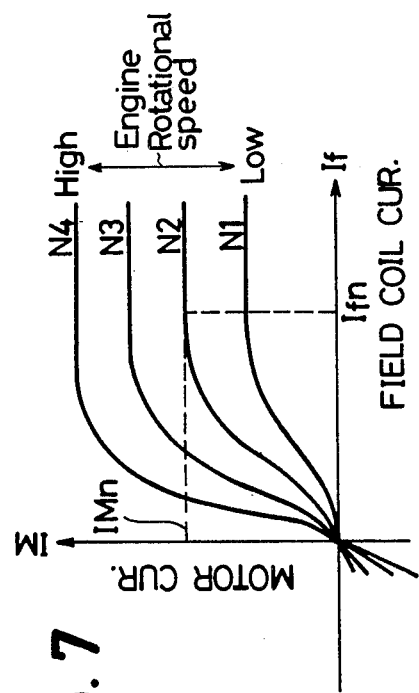

FIGS. 6(a)–(f) are time charts showing the time-dependent variations of various signals generated by the system components; and FIG. 7 is another graph showing a relationship between field coil currents of a direct current generator and currents applied from the generator to the direct current motor.

DETAILED DESCRIPTION OF THE PREFERRED EMBODIMENT

Figure 1:
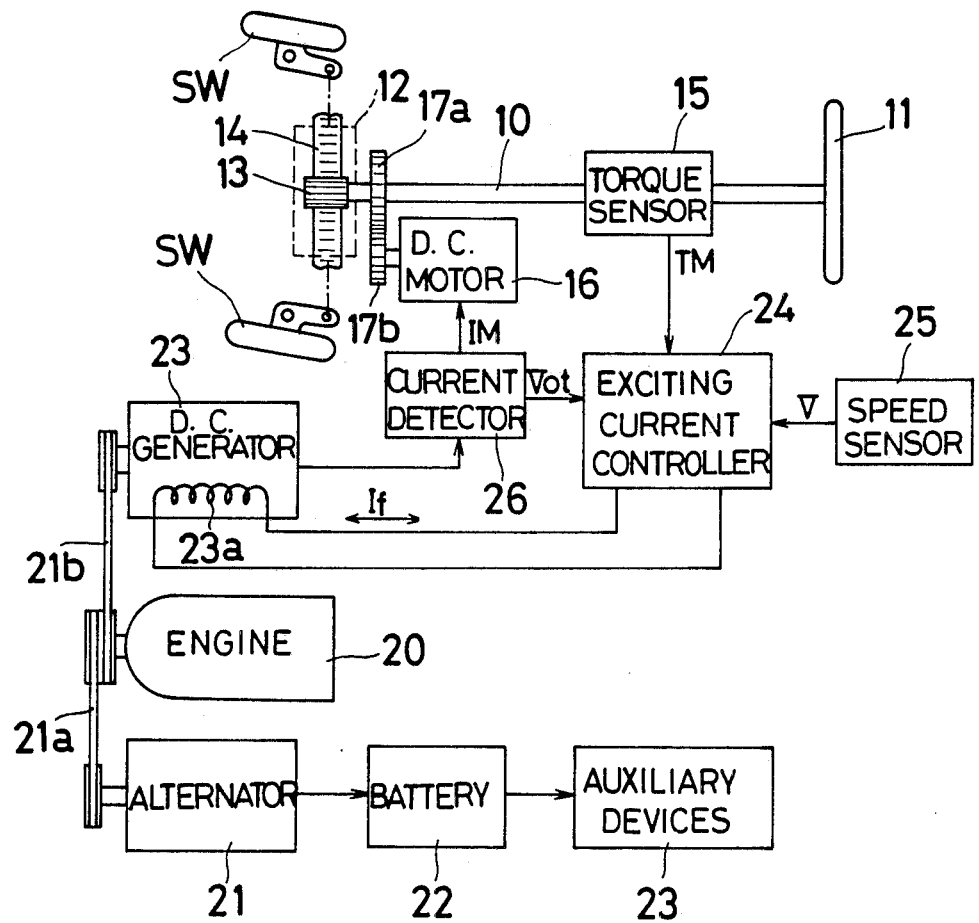
FIG. 1 is a general block diagram of an electric power steering system according to the present invention.

Referring now to the drawings and particularly to FIG. 1 thereof, a reference numeral 10 denotes a steering shaft, which has a steering 11 attached to one end thereof and which is connected at the other end thereof to a pinion shaft 13 rotatably carried in a gear box 12. The pinion shaft 13 is in meshing engagement with a rack shaft 14 which is carried by the gear box 12 for axial sliding movement. Opposite ends of the rack shaft 14 are connected to steerable wheels SW through suitable link mechanisms such as ball joints.

The steering shaft 10 is provided thereon with a torque sensor 15 for detecting a manual torque (TM) applied to the steering 11 and the direction in which the manual torque (TM) is applied. A driven gear 17a is keyed on the steering shaft 10 and is in meshing engagement with a drive gear 17b secured to an output shaft of a direct current (d.c.) motor 16 for imparting an assisting power to the steering shaft 10.

A reference numeral 20 denotes an automotive engine, which is drivingly connected to a first generator or alternator 21 through a pulley-belt mechanism 21a. The alternator 21 is coupled to a battery 22 to constitute a battery charging system, and the battery 22 serves as a power supply to various auxiliary devices 23 such as, for example, a distributor, an electric fuel injection system, lamps, a heater and many other accessories of the vehicle, as is well known in the art. The alternator 21 incorporates therein a voltage regulator (not shown), which controls the field current flowing across a field coil of the alternator 21 so as to control the generation voltage of the alternator 21. Thus, the supply of electric power to various auxiliary devices 23 of the vehicle and the battery charging operation can be properly carried out irrespective of changes in the rotational speed of the engine 20.

Also drivingly connected through another pulley-belt mechanism 21b is a second generator or direct current (d.c.) generator 23, which works as a power supply to the d.c. motor 16. To rotate the d.c. motor 16, the d.c. generator 23 generates a voltage which is controlled depending upon the engine rotational speed as well as upon the exciting current (If) applied to a field coil 23a thereof. Accordingly, the control of the exciting current (If) enables the d.c. motor to generate a rotational power which assists the driver in manipulating the steering 11 under any driving condition, as will be described later in greater detail.

The exciting current (If) is controlled by an exciting current controller 24, to which input are a manual torque signal (TM) from the torque sensor 15, a vehicle speed signal (V) from a vehicle speed sensor 25 and a voltage signal (Vot) from a current detector 26. As shown in FIG. 2, the controller 24 is primarily composed of a central processing unit (CPU) 30, to which a voltage-frequency (V−F) converter 31 and an interface 32 constituting input means are connected for respectively inputting to the CPU 30 pulse signals of the frequencies corresponding to a detected manual torque (TM) and a detected vehicle speed (V). In response to these input signals (TM, V), the CPU 30 selects an objective torque or control value (TMo) of a digital form from a memory 33 and outputs the selected objective control value (TMo) to a digital-analogue (D-A) converter 34.

Figure 4:
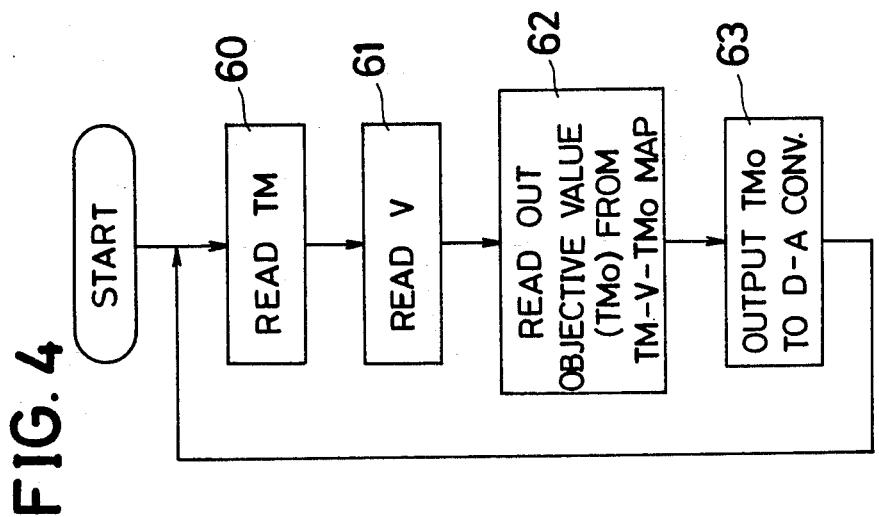
FIG. 4 is a system control program executed by a central processing unit shown in FIG. 2.

More specifically, the memory 33 stores therein a system control program SCP for enabling the CPU 30 to perform such a selection operation. When an ignition switch (not shown) of the vehicle is turned on, this program starts to read a detected manual torque (TM) in step 60 of FIG. 4 and a detected vehicle speed (V) in step 61. The magnitude of the manual torque (TM) is read by counting a number of pulses which are input to the CPU 30 during a predetermined time period, and the direction in which the manual torque (TM) is applied (i.e., whether right turn or left turn) is detected by comparing the counted pulse number with a reference number which is counted as the steering 11 is in the neutral position. The magnitude of the vehicle speed (V) can be read in the same manner as the detection of the manual torque (TM). Then, the CPU 30 reads out from a characteristic control map CCM stored in the memory 33 an objective control value (TMo) in step 62 and outputs the read-out objective control value (TMo) to the D-A converter 34 in step 63. Return is then made to step 60, whereby the above-noted processings are repeatedly executed.

Figure 5:
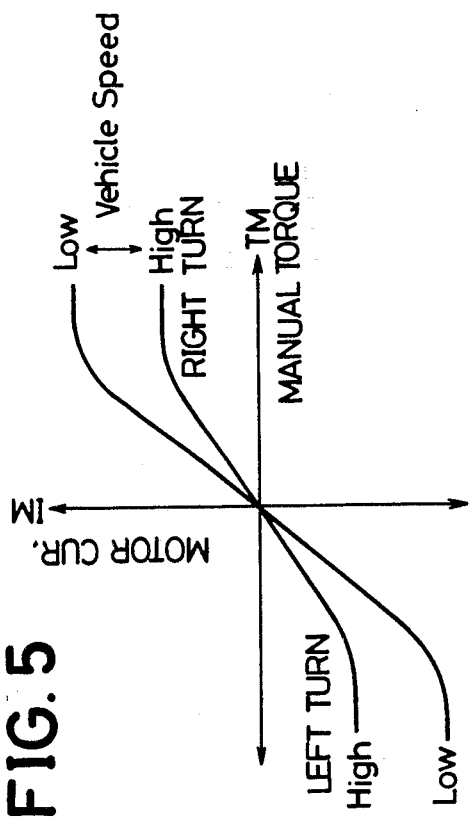
FIG. 5 is a graph showing a relationship between a manual input torque and a motor current according to which relationship the exciting current controller controls electric current applied to a direct current motor shown in FIG. 1.

The map CCM may be of a matrix configuration, in which numerous objective control values (TMo) are defined in association with various manual torques (TM) and various vehicle speeds (V). These parameters of the map CCM are determined such that the map CCM provides the illustrated system with a control characteristic as shown in FIG. 5. That is, when the steering system is controlled in accordance with the map CCM, the electric current (IM) applied to the d.c. motor 16 is generally increased with an increase of the manual torque (TM) applied to the steering 11, irrespective of the direction in which the steering 11 is turned. However, the rate of an increase in the motor current (IM) is reduced with an increase in the vehicle speed (V). Consequently, the assisting power generated by the d.c. motor 16 increases in proportion to the manual torque (TM) applied to the steering 11 and becomes larger as the vehicle speed (V) is decreased.

Referring back to FIG. 2, the D-A converter 34 converts the objective control value (TMo) from the CPU 30 into a corresponding voltage signal for inputting to a subtraction circuit 35. This circuit 35 also receives the voltage signal (Vot) which is representative of an output torque generated by the d.c. motor 16, from the current detector 26 and calculates a differential torque value (TMd) between the objective torque value (TMo) and the output torque value (Vot) to input the differential torque value (TMd) to a pulse width modulator 36. The pulse width modulator 36 generates first and second pulse trains (PT1, PT2) based upon the differential torque value (TMd) and a saw-tooth wave signal. Logical statuses of the first and second pulse trains (PT1, PT2) are complementary so that as each pulse of one pulse train (PT1) has a longer period to be in the logical "1" status, each pulse of the other pulse train (PT2) has a shorter period to be logical "1" status. These pulse trains (PT1, PT2) are supplied through a drive circuit 37 to a switching circuit 38 for controlling the duty ratio between electric currents which flow across the field coil 23a of the d.c. generator 23 in opposite directions.

Figure 6:
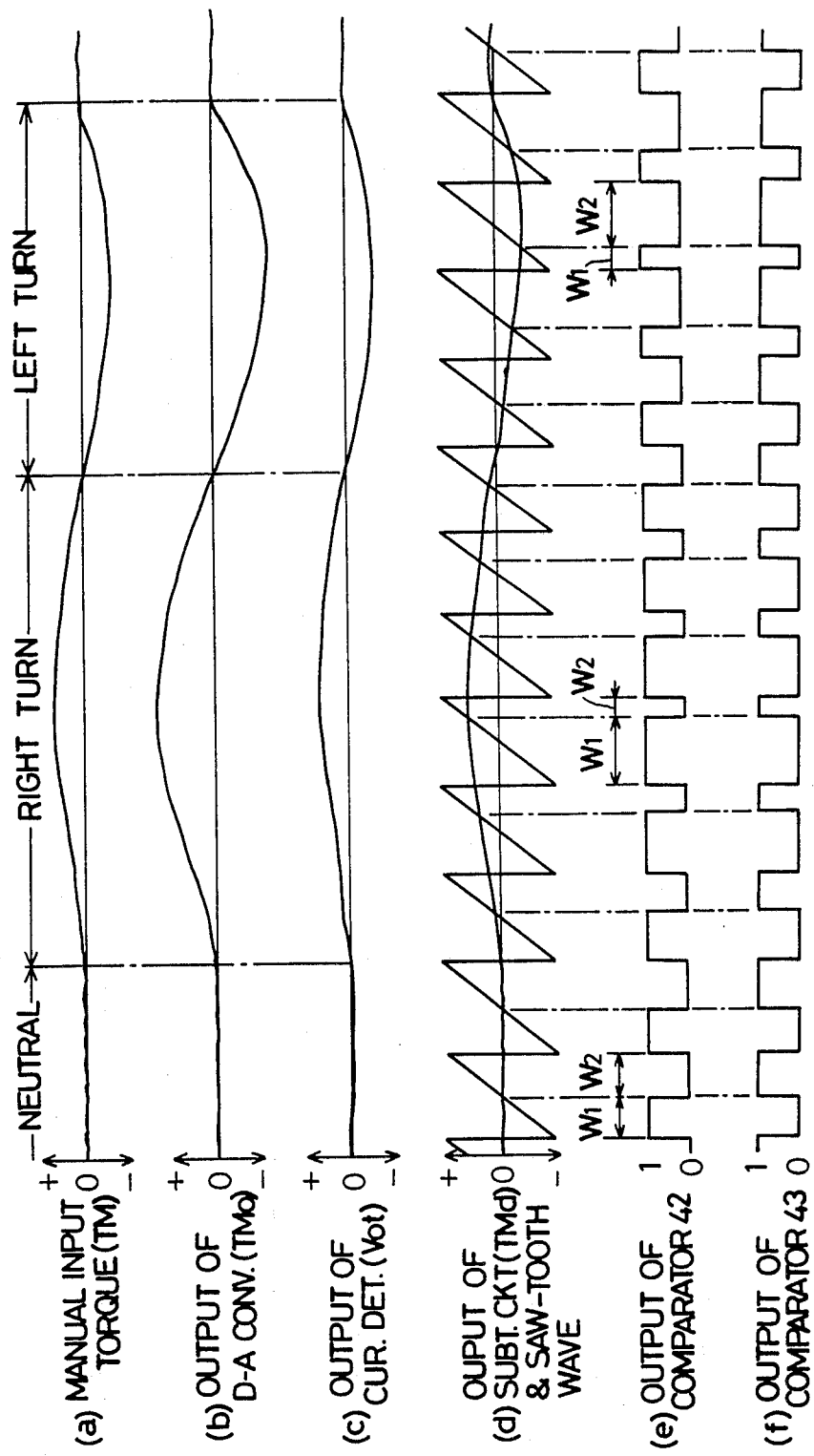

FIG. 3 shows the detail of the above-noted subtraction circuit 35, pulse width modulator 36, the drive circuit 37 and the switching circuit 38. Assuming not that the manual torque (TM) applied to the steering 11 varies as shown in FIG. 6(a) as a result of the steering 11 being turned from the neutral position first right and then left, the objective torque value (TMo) input to the subtraction counter 35 varies as shown in FIG. 6(b). This value (TMo) does not perfectly follow the manual torque (TM), because it is modified by the CPU 30 taking the vehicle speed (V) into account, as mentioned previously. The subtraction circuit 35 subtracts at a connection point 40 the output torque value (Vot) which varies as shown in FIG. 6(c), from the objective torque value (TMo) to obtain a differential torque value (TMd). The subtraction circuit 35 includes an operational amplifier 41 for amplifying the differential torque value (TMd). Thus, the differential value (TMd) which varies as shown in FIG. 6(d) is input to plus and minus terminals of first and second comparators 42, 43 constituting the pulse width modulator 36.

Minus and plus terminals of these comparators 42, 43 are supplied with the saw-tooth wave signal from a saw-tooth wave oscillator 44. The saw-tooth wave signal periodically varies its voltage level from a minus N-volts to a plus N-volts, as shown in FIG. 6(d). At each crossing point of the differential value (TMd) with the saw-tooth wave, each pulse from the first comparator 42 trails, while each pulse from the second comparator 43 rises at the same time, as shown in FIGS. 6(e) and 6(f). Thus, with the steering 11 being in the neutral position, the period W1 during which each pulse from the first comparator 42 is in a high level is equal to the period W2 during which each pulse from the second comparator 43 is in a high level. However, the period W1 becomes longer than the period W2 at the right turn and shorter than the period W2 at the left turn.

The drive circuit 37 comprises a first pair of power amplifiers 46, 47 each receiving the first pulse train (PT1) from the first comparator 42 and a second pair of power amplifiers 48, 49 each receiving the second pulse train (PT2) from the second comparator 43. It is preferable to constitute each of these power amplifiers 46–49 by a pair of a light emitting diode and a light responsive transistor.

The switching circuit 38 includes four power transistors 51–54. Two transistors 51, 52 are connected in series between power lines of the battery 22, and the remaining two transistors 53, 54 are connected in series between the power lines, but in parallel with the transistors 51, 52. The transistors 51, 54 are coupled at their base terminals to the amplifiers 46, 47 so as to be made conductive in response to each pulse from the first comparator 42, while the transistors 53, 52 are coupled at their base terminals to the amplifiers 48, 49 so as to be made conductive in response to each pulse from the second comparator 43. The field coil 23a of the d.c. generator 23 is coupled at its one end between the transistors 51 and 52 in series and at the other end between the transistors 53 and 54 in series. Thus, each time the transistors 51 and 54 are made conductive in response to each pulse from the first comparator 42, an electric current across the field coil 23a flows in one direction. On the other hand, each time the transistors 53 and 52 are made conductive in response to each pulse from the second comparator 43, an electric current across the field coil 23a flows in the other direction.

The effective current (If) flowing across the field coil 23a is determined by the ratio of the above-noted periods W1, W2 during which each pulse from the first comparator 42 and each pulse from the second comparator 43 are respectively at high levels "1". Consequently, no effective current (If) flows across the field coil 23a when the steering 11 is in the neutral position. This causes the motor current (IM) from the d.c. generator 23 to the d.c. motor 16 to remain zero, whereby no assisting power is generated by the d.c. motor 16. However, when the steering 11 is manually turned right or left, the effective current (If) corresponding to the ratio of the above-noted pulse widths W1, W2 flows across the field coil 23a, which causes the d.c. generator 23 to generate a motor current (IM) with a plus or minus polarity, thereby rotating the d.c. motor 16 in one direction or the other direction. The motor current (IM) to the d.c. motor 16 is increased until the differential value (TMd) output from the subtraction circuit 35 becomes zero. Consequently, the assisting power generated by the d.c. motor 16 is controlled to follow the objective torque value (TMo) which is selected by the CPU 30 based upon the signals (TM, V) from the torque sensor 15 and the speed sensor 25.

FIG. 7 shows the input-output characteristic of the d.c. generator 23. As clear therefrom, the electric current (IM) generated by the generator 23 depends upon the engine rotational speed and the electric current (If) applied to the field coil 23a of the generator 23. For example, the generator 23 at 4,000 (N2) r.p.m. makes 45 (IMn) amperes from 3 (Ifn) amperes applied to the field coil 23a. It will be therefore realized that a large electric current (IM) applied to the d.c. motor 16 can be easily controlled by adjusting a small electric current (If) applied to the field coil 23a of the d.c. generator 23 which works as a power supply to the d.c. motor 16.

Obviously, numerous modifications and variations of the present invention are possible in light of the above teachings. It is therefore to be understood that within the scope of the appended claims, the present invention may be practiced otherwise than as specifically described herein.

What is claimed is:

1. An electric power steering system for a motor vehicle having an engine, a battery for supplying electric power to various auxiliary devices such as lights, a heater and the like, and a first generator driven by said engine and electrically connected to said battery for charging the same, said system comprising:
   a steering shaft having a steering wheel and rotatable by a manual torque applied to said steering wheel;
   a mechanism connected to said steering shaft for controlling the orientation of a steerable wheel upon rotation of said steering shaft;
   a torque sensor for detecting said manual torque applied to said steering wheel;
   an electric motor drivingly connected to said steering shaft for generating an assisting power to rotate said steering shaft;
   a second generator driven by said engine for supplying an electric power to said electric motor; and
   a control circuit responsive to a signal from said torque sensor for controlling the electric power generated by said second generator.

2. An electric power steering system for a motor vehicle having an engine, a battery for supplying electric power to various auxiliary devices such as lights, a heater and the like, and a first generator driven by said engine and electrically connected to said battery for charging the same, said system comprising:
   a steering shaft having a steering wheel and rotatable by a manual torque applied to said steering wheel;
   a mechanism connected to said steering shaft for controlling the orientation of a steerable wheel upon rotation of said steering shaft;
   a torque sensor for detecting said manual torque applied to said steering wheel;
   an electric motor drivingly connected to said steering shaft for generating an assisting power to rotate said steering shaft;

a second generator driven by said engine for supplying an electric power to said electric motor; and a control circuit responsive to a signal from said torque sensor for controlling the electric power generated by said second generator, including means responsive to said signal from said torque sensor for controlling the magnitude of an electric current which flows across a field coil of said second generator and the direction in which said electric current flows across said field coil.

3. An electric power steering system for a motor vehicle having an engine, a battery for supplying electric power to various auxiliary devices such as lights, a heater and the like, and a first generator driven by said engine and electrically connected to said battery for charging the same, said system comprising:

a steering shaft having a steering wheel and rotatable by a manual torque applied to said steering wheel;

a mechanism connected to said steering shaft for controlling the orientation of a steerable wheel upon rotation of said steering shaft;

a torque sensor for detecting said manual torque applied to said steering wheel;

an electric motor drivingly connected to said steering shaft for generating an assisting power to rotate said steering shaft;

a second generator driven by said engine for supplying an electric power to said electric motor;

a vehicle speed sensor for detecting a vehicle speed; and a control circuit responsive to a signal from said torque sensor for controlling the electric power generated by said second generator, including:

memory means for storing a plurality of objective values each corresponding to an objective torque which is to be generated by said electric motor;

selector means responsive to signals from said torque sensor and said vehicle speed sensor for selecting one of said objective values stored in said memory means;

an output torque detector for detecting an output torque generated by said electric motor;

a subtraction circuit responsive to said selected objective value and a signal from said output torque detector for calculating a differential signal; and generator control means responsive to said differential signal from said subtraction circuit for controlling an electric current flowing across a field coil of said second generator in such a manner that said differential signal from said subtraction circuit becomes zero.

* * * * *